(No Model.)

C. H. HANSEN.
PROCESS OF PREPARING MATRICES FOR PRODUCING PRINTING PLATES.

No. 250,239. Patented Nov. 29, 1881.

Witnesses:
Fred. G. Dietrich
Jno. P. Brooks

Inventor:
Christian H. Hansen
by Wm. Bagger,
Attorney.

N. PETERS, Photo-Lithographer, Washington, D. C.

UNITED STATES PATENT OFFICE.

CHRISTIAN H. HANSEN, OF WASHINGTON, DISTRICT OF COLUMBIA.

PROCESS OF PREPARING MATRICES FOR PRODUCING PRINTING-PLATES.

SPECIFICATION forming part of Letters Patent No. 250,239, dated November 29, 1881.

Application filed June 10, 1881. (No model.)

*To all whom it may concern:*

Be it known that I, CHRISTIAN H. HANSEN, of Washington, in the county of Washington and District of Columbia, have invented certain new and useful Improvements in Processes of Preparing Matrices for Producing Printing-Plates; and I do hereby declare that the following is a full, clear, and exact description of the invention, that will enable others skilled in the art to which it appertains to make and use the same, reference being had to the accompanying drawings, and to the letters and figures of reference marked thereon, which form a part of this specification.

The same letters and figures of reference are used to indicate the corresponding parts.

After describing the invention, its nature and extent will be shown in the claim.

This invention relates to an improved method or process of engraving, or, more properly, of preparing blocks for printing, similar to hand-engraved, but more rapidly and at a much less expense.

My invention consists in certain improvements in the said art, which will be hereinafter fully described, and particularly pointed out in the claim.

In carrying out my invention I proceed as follows: I first provide a smooth level plate of some suitable hard material and of a size somewhat exceeding that of the engraving which it is desired to produce. A piece of plate-glass will answer admirably; but any other suitable material may be substituted. The face of this plate is covered with a thin coating of tallow, lard, oil, beeswax, or with some suitable compound ointment, preferably of an unctuous character, which shall admit of being spread evenly upon the base-plate, and which shall enable a sheet of tin-foil to adhere to the composition on said plate with such a degree of tenacity as to prevent it from being displaced when manipulated, as will be afterward described.

To enable my invention to be clearly understood, reference may be had to the accompanying drawings, in which—

Figure 1:
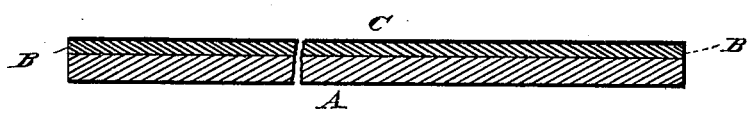
Figure 2:
Figure 3:
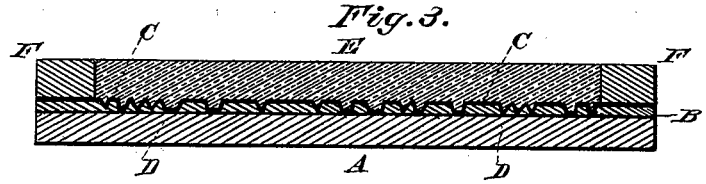
Figure 4:
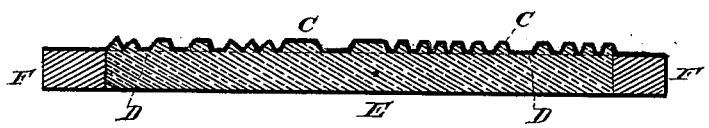
Figure 5:
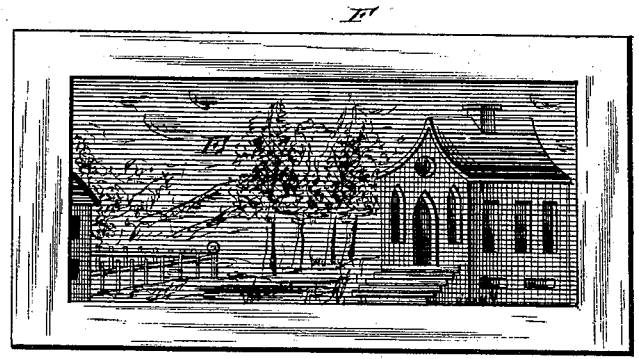

Figure 1 is a sectional view of the base-plate after the application of the tin-foil. Fig. 2 is a similar view, showing the indentations formed in preparing the engraving. Figs. 3 and 4 are sectional views, showing various steps of the process; and Fig. 5 is a plan view of the matrix detached.

A represents the base-plate, C the tin-foil, and B the intervening layer of tallow or other substance.

The tin-foil, having been attached to the composition on the plate A, is ready for the draftsman or artist, who, with a style, pencil, or other instrument, proceeds to draw the sketch, or whatever it may be, of which an engraving is required, taking care to exert sufficient pressure to indent the tin-foil to the depth of the base-plate, the intervening layer, B, serving to give depth and tone to the lines, which may be made fine or coarse by using suitably-pointed tools. In this manner letters may be written and sketches or drawings executed very rapidly and with great facility. In Fig. 2 the indented lines thus formed by the draftsman may be seen at D. The next step is to place the prepared plate in a level position and pour over it a quantity of plaster-of-paris, of which the matrix over which the stereotype or electrotype afterward to be made is formed. In Fig. 3, E represents the plaster matrix, and F a frame placed upon the prepared plate to prevent the plaster from spreading. As soon as the plaster is sufficiently hardened or set the matrix is removed from the bed-plate. This may be easily accomplished by slightly heating the under side of plate A, thus melting or softening the intervening layer B, when the tin-foil, with its plaster backing, may be readily removed. This is shown in section in Fig. 4 of the drawings. The face of the matrix (which is formed by the tin-foil) is now washed with benzine, turpentine, or other material, for the purpose of removing any portion of the intervening substance which may still adhere, and the matrix is now ready for stereotyping or electrotyping, which processes, being accomplished in the usual well-known manner, I deem it unnecessary to describe.

I have found by experience that by drawing in the tin-foil with suitable tools lines may be obtained as clear and sharp as the finest line-engraving, the intervening layer, B, serving not only to hold the foil upon the bed-plate, but to give depth, tone, and richness. Its thickness may therefore be varied to suit circumstances.

To obtain correct likenesses of individuals, scenes from nature, &c., such likenesses are to be photographed upon the tin-foil, to serve as a guide for the draftsman, whose task is thus reduced to a mere mechanical one.

By my improved process it will thus be seen that complete printing-blocks of any subject may be produced with great rapidity and accuracy and at a trifling expense.

I would state that in lieu of tin-foil other equivalent material—such as gold-foil—may be employed in carrying out my invention.

Without departing from the spirit of my invention any suitable material may also be substituted for plaster-of-paris for the purpose of backing the tin-foil or equivalent in forming the matrix.

Having thus described my invention, I claim and desire to secure by Letters Patent of the United States—

The method of forming matrices for the production of printing-plates, which consists in first applying to a bed a yielding adhesive layer of material, and upon this tin-foil, next indenting the tin-foil through the layer of adhesive material to the plate or bed by means of a stylus, and then backing the tin-foil with plaster-of-paris, substantially as described.

In testimony whereof I have hereto set my hand in the presence of two witnesses.

CHRISTIAN H. HANSEN.

Witnesses:
GEO. F. GRAHAM,
J. WALTER, M. D.